(12) United States Patent
Zhu et al.

(10) Patent No.: US 8,145,873 B2
(45) Date of Patent: Mar. 27, 2012

(54) DATA MANAGEMENT METHOD FOR NETWORK STORAGE SYSTEM AND THE NETWORK STORAGE SYSTEM BUILT THEREOF

(76) Inventors: Yaolong Zhu, Beijing (CN); Hui Xiong, Beijing (CN); Jie Yan, Beijing (CN)

( * ) Notice: Subject to any disclaimer, the term of this patent is extended or adjusted under 35 U.S.C. 154(b) by 808 days.

(21) Appl. No.: 11/884,938

(22) PCT Filed: Feb. 23, 2006

(86) PCT No.: PCT/CN2006/000256
§ 371 (c)(1),
(2), (4) Date: Jan. 8, 2008

(87) PCT Pub. No.: WO2006/089479
PCT Pub. Date: Aug. 31, 2006

(65) Prior Publication Data
US 2009/0177860 A1    Jul. 9, 2009

(30) Foreign Application Priority Data

Feb. 23, 2005 (CN) .......................... 2005 1 0011340

(51) Int. Cl.
*G06F 12/08* (2006.01)
*G06F 15/167* (2006.01)
(52) U.S. Cl. .................. 711/173; 709/215; 711/153
(58) Field of Classification Search .......... None
See application file for complete search history.

(56) References Cited

U.S. PATENT DOCUMENTS

| | | | |
|---|---|---|---|
| 6,640,278 B1 | 10/2003 | Nolan et al. | |
| 6,714,968 B1 | 3/2004 | Prust | |
| 6,848,034 B2 * | 1/2005 | Cohn et al. | 711/153 |
| 7,000,085 B2 * | 2/2006 | Camble et al. | 711/164 |
| 7,096,319 B2 * | 8/2006 | Mogi et al. | 711/129 |
| 7,113,497 B2 | 9/2006 | Cromer et al. | |
| 2003/0210672 A1 | 11/2003 | Cromer et al. | |
| 2004/0205120 A1 * | 10/2004 | Dar et al. | 709/203 |

FOREIGN PATENT DOCUMENTS

CN         1540524 A       10/2004

OTHER PUBLICATIONS

International search rep., May 11, 2006.

* cited by examiner

*Primary Examiner* — Gary Portka
(74) *Attorney, Agent, or Firm* — Workman Nydegger

(57) ABSTRACT

A data management method for network storage system that said network storage system includes a storage network, a cluster of storage servers that provide data storage services for application servers connecting to the storage network and storage space corresponding to each storage server, setting a core manager in storage server, said core manager centralizing the metadata of all storage servers in a common storage space; separating the metadata from said storage servers to make a storage server become a storage manager and the storage spaces corresponding to each storage server form the common storage space, allocating the storage space of metadata in said common storage space, and managing the corresponding relationship between metadata and said storage manager.

6 Claims, 9 Drawing Sheets

DATA MANAGEMENT METHOD FOR NETWORK STORAGE SYSTEM AND THE NETWORK STORAGE SYSTEM BUILT THEREOF

FIELD OF THE INVENTION

This invention relates to the field of network storage technology especially involves the data and metadata management in network storage system, and the network storage system architecture.

BACKGROUND OF THE INVENTION

Network storage system is based on the storage network, and storage server is the core of the network. This system provides data storage services for the application servers. The system emphasizes data services scalability, reliability and ability to handle dynamically. The most commonly used technology is the Storage Area Network (SAN). Storage area network is an independent network made up of storage servers, storage devices and storage network equipment. The storage area network provides a high-speed, dedicated, centralized managed, and security architecture.

In SAN, with the adding of storage servers, the overall I/O performance drops, therefore the shortcoming limits the use of the storage architecture. Particularly, with the development of the independent metadata server architecture, the dynamic scalability of storage servers (such as metadata servers) has become even more crucial issue to overall system performance. In the design of current metadata server, metadata servers usually use their own storage space to store metadata. The own storage space here means the storage space from the server's own hard disks. In general, metadata server cluster (storage server cluster), mainly uses two methods of data storage and management.

One method is that each metadata server of the cluster preserves part of the overall metadata table, so the overall metadata table is a combined table of all metadata servers' table. Under this architecture, each metadata server can achieve high data access performance and data storage efficiency without other synchro-mechanism. However, this design is bad during disaster and can not provide load balancing capabilities of metadata server cluster. The failure of a metadata server will lead to the loss of some metadata tables. The imbalance of metadata's dynamic load will lead to a lot of metadata access to one server, and the performance of metadata server cluster will drop.

The other method is that each metadata server of the cluster preserves a copy of synchronous overall metadata table in its local, so each metadata server can access the overall metadata table, including access of reading and writing. The metadata servers use a synchronization mechanism to ensure the integrity of overall metadata. So metadata server cluster can have a good balance of load capacity and disaster recovery capabilities. But usually metadata accesses are frequent small I/O requests, and the metadata server synchronization mechanism will seriously damage performance of the metadata server cluster, thereby the performance of the overall storage system will decline. Because of the cost of this synchronization mechanism, the metadata server cluster is limited in scalability. Because adding new metadata server means that we need to synchronize more overall metadata tables. This metadata management mechanism reduces the efficiency of metadata storage because each metadata record should have its corresponding local copy in every server.

SUMMARY OF THE INVENTION

The aim of this invention is to provide a method of data management in network storage system. This method can effectively solve the scalability issue in current network storage system. This method also solves other problems, such as metadata server failure and its recovery, storage server cluster load balancing, and reconstruction. The method provides the dynamic handling capacity of the system, and greatly enhances the reliability and data availability.

Another aim of this invention is to provide a network storage system built by the method. The metadata servers in the system support dynamic scalability, and dynamic handling and recovering of failure of storage servers, and also provide better performance in disaster recovery. This invention also achieves good storage performance during load balancing and reconstruction of the storage server cluster.

The first objective of the invention is achieved as following: A data management method is provided for a network storage system, wherein said network storage system includes a storage network, cluster of storage servers that provide data storage services to the application servers connecting to the storage network, and storage space corresponding to each storage server, wherein said data includes raw data that are accessed by the application servers and metadata corresponding to the storage servers, said method comprises setting a core manager in each storage server, said core manager centralizing the metadata of all storage servers in a common storage space, separating the metadata from said storage servers to make a storage server become a storage manager and the storage spaces corresponding to storage servers form the common storage space, allocating the storage space of the metadata in said common storage space, and managing the corresponding relationship between the metadata and said storage manager.

Technical Effect

Since the invention forms a common storage space for the storage servers by core managers, the corresponding storage space of storage servers is no longer local or private storage space of the storage servers, but part of the common storage space managed by the core managers. The metadata of the corresponding storage space of the server is separated from the respective storage server and is located by the core manager according to the efficient management's needs of the common storage space.

The storage server that only manages metadata is defined as storage manager, and the corresponding storage server cluster is called a storage manager cluster. The storage manager will no longer have the corresponding storage space and the corresponding metadata, but only manage the metadata allocated by the core manager.

With the separation of metadata, the storage managers no longer own their own metadata. Therefore the scalability, the server failure handling, dynamic load balancing and reconstruction of the cluster are all independently operated with the metadata. The invention can effectively solve the scalability issues. It also solves technical problems of dynamic failure and recovery of storage manager, load balancing of the storage manager cluster, and reconstruction of the storage manager cluster.

A preferred design is that the common storage space has partitions. Storage manager has one-to-one and/or one-tomore mapping relation with the partitions. Because the common storage space has partitions, the management of the core manager is more convenient. Numbering the partitions and setting corresponding relationship between partitions and each storage manager, the data can be managed efficiently. Every partition of the common storage space can be mapped in any one storage manager. But at the same time, only one storage manager can lock the partition and access it exclusively.

In particular, the core manager includes allocation controller, mapping controller and partition controller. Allocation controller distributes metadata in the partition of the common storage space. Mapping controller manages the mapping relationship between the partitions of the common storage space and storage managers by a mapping table. Partition controller manages partitions of the common storage space.

The invention can efficiently achieve data access of the system, the scalability and failure treatment. The process of the dynamic load balancing and reconstruction of the storage manager cluster refers to the detailed description below.

The solution to achieve the second objective of the invention is as follows: network storage system includes a storage network, a storage server cluster providing data storage service to the application server connected to the net, and the storage space for metadata, further includes a core manager in each storage server, said core manager centralizing the metadata of all storage servers in a common storage space makes a storage server become a storage manager and the storage spaces corresponding to each storage server form the common storage space, allocating the storage space of metadata in the said common storage space, and managing the corresponding relationship between metadata and said storage manager.

Technical Results

The storage manager has no corresponding storage space to store corresponding metadata in the network storage system built by the invention. The core manager allocates the common storage space. The storage manager realizes the separation of metadata. The scalability, failure handling, and dynamic load balancing and reconstruction of the storage manager cluster become unrelated operation with metadata. Thus the storage manager cluster has dynamic scalability. It can dynamically handle and restore failure of storage server. The storage manager supports load balancing and reconstruction of storage server cluster when the system is in the condition of high efficient storage.

The network storage system built by the method can set partitions of the storage space. Storage manager and partitions have one-to-one and/or one-to-more mapping relationship. The core manager is made up of the allocation controller, the mapping controller and the partition controller for the storage manager. The allocation controller distributes metadata in the partition of the common storage space. The mapping controller manages the mapping relationship between the partitions of the common storage space and storage managers by a mapping table. The partition controller manages partitions of the common storage space.

When the above preferred solution is actually operated, each storage manager stores the data in its partition. The metadata of the data is concentrated in the common storage space. The process of scalability, the failure handling and dynamic load balancing of storage manager don't have to move the actual data, but only need to adjust the mapping relation of storage manager and partition. The allocation of data storage is based on partition but not on storage manager.

Data storage's location is determined by the number of partition, not by the storage server. The network storage system of the invention provides the storage manager cluster an excellent scalable architecture. The scalability, and the failure treatment and dynamic load balance of storage manager is a process unrelated to the data. This method greatly improves failure control capability, the data reliability and availability of the storage manager cluster.

In addition, each partition in the common storage space can only be accessed by an exclusive storage manager. So there is no need to synchronize metadata or have locking policy for metadata to access the same partitions (for example, distributed file system). The access progress can achieve the similar performance as the local file system. The invention can maximize the use of caches of the storage managers and enhance greatly the performance of data access.

DETAILED DESCRIPTION OF EMBODIMENTS

Combining attached drawings is combined below to explain the embodiment of the invention.

Figure 1:
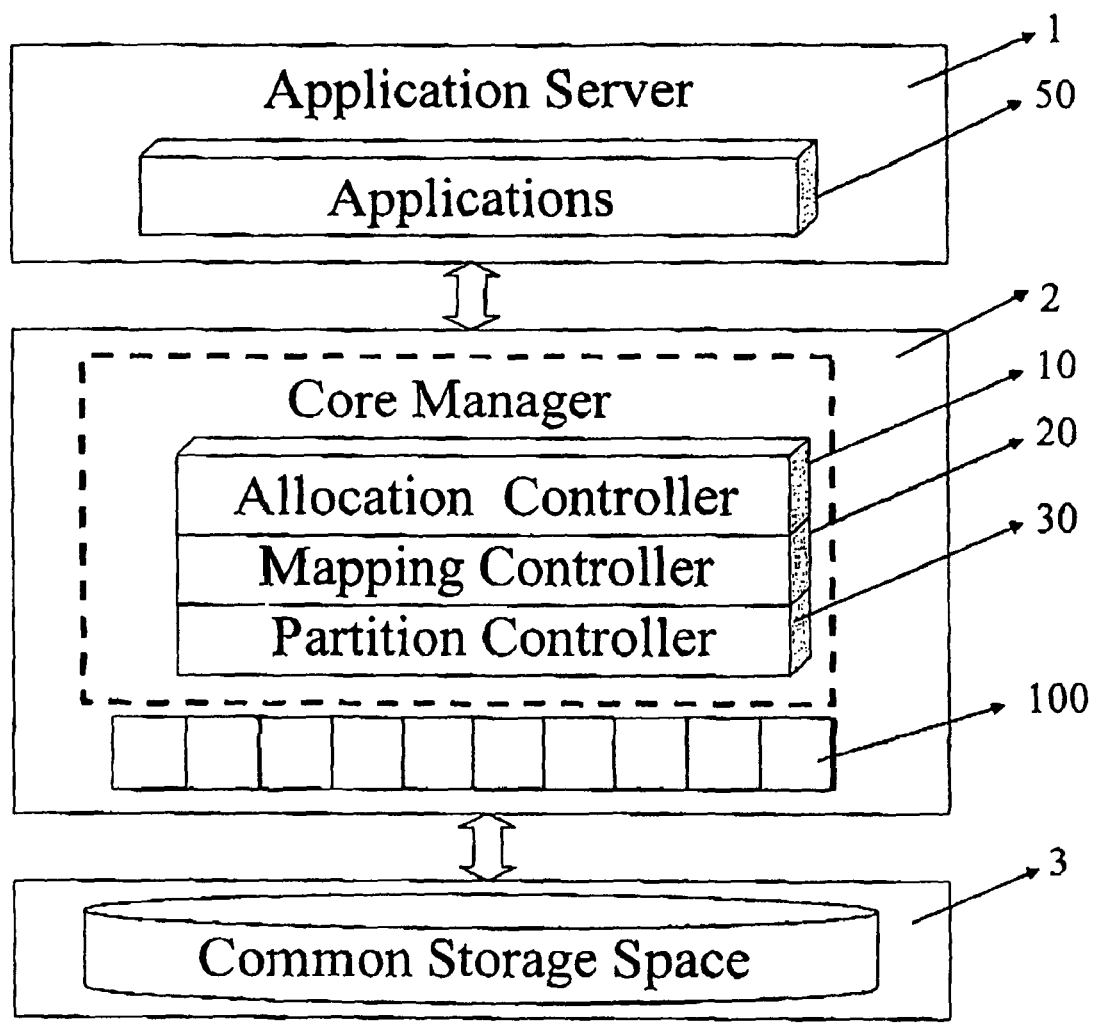
FIG. 1: logical structure sketch map of network storage system built by the invention method.

FIG. 1 describes the logic structure of a network storage system built by this invention method. The network storage system of FIG. 1 includes the storage network (FIG. 1 does not draw, see storage network 103 in FIGS. 7, 8), the storage manager cluster 2 is connected to the storage network providing data storage services for the application server 1 and the common storage space 3. In the storage manager cluster 2, each storage manager sets a core manager. The common storage space 3 is used for all storage managers in the storage manager cluster 2. The Core manager manages the storage location of metadata in the common storage space and the correspondence between metadata and each storage manager. In this preferred embodiment, the core manager is made up of the allocation controller 10, the mapping controller 20 and the partition controller 30. The common storage space 3 is divided into partition 100. The Allocation controller 10 is used for realizing allocation of data in the partition 100 of the common storage space 3. It can achieve static storage load balancing based on the partition 100. Mapping controller 20 is used for mapping management between the partition 100 of the common storage space 3 and the storage manager cluster 2. A mapping table is used to maintain this mapping relationship. The Allocation controller 30 achieves the management function of the partition 100 of the common storage space 3. For example, we can install or uninstall the partition 100 of the common storage space 3 from the storage manager. The Partition 100 of the common storage space 3 and the mapping table of each storage manager maintained by the mapping controller 20 can be shared by all servers.

Figure 2:
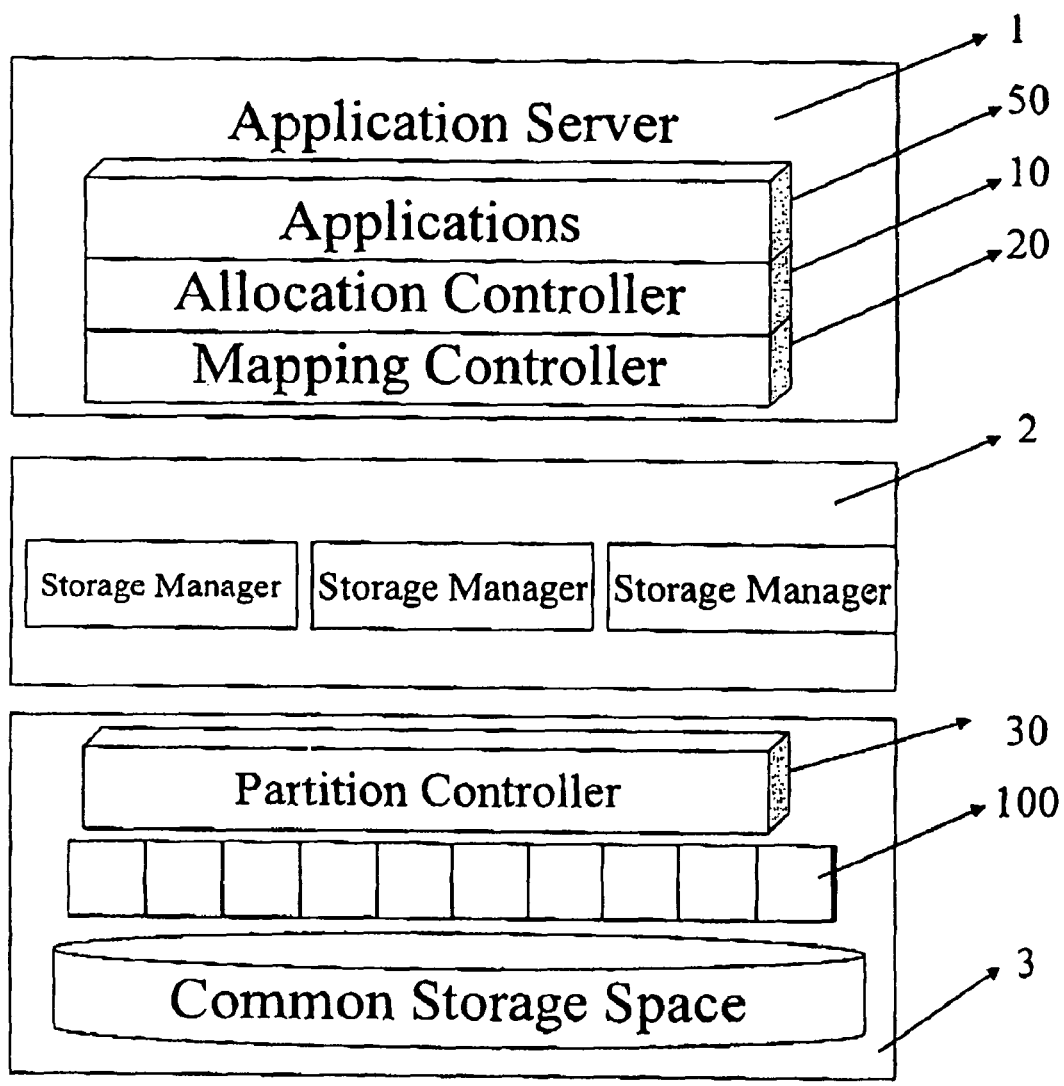
FIG. 2: logical structure sketch map of separated functions of the network storage system built by the invention method.

FIG. 2 describes the separated functions logic structure of network storage system. The Allocation controller 10 and the mapping controller 20 run on the application server. The Partition controller 30 runs in the common storage space.

A variety of file-based application server 1 provides relevant services and generates I/O requests for the network storage system. It is the initiator of the storage process. The Application server cluster include video servers, web servers, database servers, mail servers and file servers, see FIG. 8, FIG. 9. These servers are distributed, and communicate through the storage network. In the FIG. 1, the applications 50 run on an application server.

Centralization of storage and management is the guiding ideology for the seamless extension of the storage manager cluster. The centralization is referred to form the common storage space. And a preferred method is to manage the partitions of the common storage space. The Core manager is installed in the original storage server. The Common storage space is made up of storage space corresponding to storage servers. Storage servers which are separated with their metadata become storage managers. The Core manager in the storage manager manages storage location of metadata in the common storage space and corresponding relationship of metadata with the storage managers. Metadata isn't stored in the corresponding space of each storage manager. That means the corresponding space of each storage manager is separated from the metadata. Though the core manager is set in the storage manager and need synchronization mechanism, the synchronization is irrelevant to the metadata, it will not affect the overall performance of the storage manager cluster 2 and the performance of entire storage system.

Storage resources are most efficiently exclusively accessed by the partition in the common storage space 3. The storage manager in essence is such a server that doesn't contain metadata and can be dynamically changed. Based on features of this technical solution, scalability and failure treatment and dynamic load balancing of the storage manager cluster 2 can be simply and efficiently managed by adjusting mapping relationship between the partition 100 of the common storage space 3 and each storage manager. The above scalability process has been simplified for some install and uninstall work. Without any data movement, the storage manager cluster 2 can be seamlessly expanded.

Generally speaking, a large number of partitions can assure a seamless dynamic scalability of the cluster. The number of partitions restricts the number of clusters. For example 1024 partitions show that the system can have up to 1024 storage managers. In some special cases, when the cluster need to break through the number of partitions to expand, for example, the need to cluster scalability to more than 1024, the system would need to expand the common storage space, and produce more partitions, such as 4096. Then after reconstruction of the storage manager cluster, the cluster can be achieved with greater scalability.

The partition 100 is similar to the concept of logical partitions. Each partition can be mapped in any storage manager. At the same time, only a storage manger maps this partition and accesses it. A storage manager can map one or move partitions of the common storage space. The Partition controller 30 can achieve the management of all the partitions of the common storage space 3. Its main functions include mapping installing and uninstalling and backup and log functions of the partition.

The above technology solution's effect is obvious. The creation of partition 100 of common storage space 3 makes the metadata out of storage managers cluster 2, so that the storage managers can be replaced. This is because the allocation of metadata storage is based on the partition but not on the storage manager. The location of metadata storage is decided by the partitions number rather than the storage manager used for storage. Therefore the progress of adding storage managers and failure treatment and dynamic load balancing becomes the operation unrelated to metadata. We do not need to move actual metadata, only to adjust mapping relations between the partitions of the common storage space and storage managers. Thus, the architecture of the storage manager cluster based on network storage has high seamless scalability, and greatly improves the storage manager cluster's dynamic managing capability and the data reliability and availability.

In addition, the common storage space in each partition can only be accessed by an exclusive storage manager. This makes storage managers in the course of the access do not need to consider synchronization of sharing (for example, distributed file system). The access progress can achieve the similar performance of the local file system. The invention maximizes the use of caches of storage managers, and enhances greatly the performance of data access.

As long as we ensure the metadata security of the common storage space, the metadata of the entire system is safe. Of course, compared to the scattered metadata, a centralized storage space is more easily to achieve metadata security.

Figure 3:
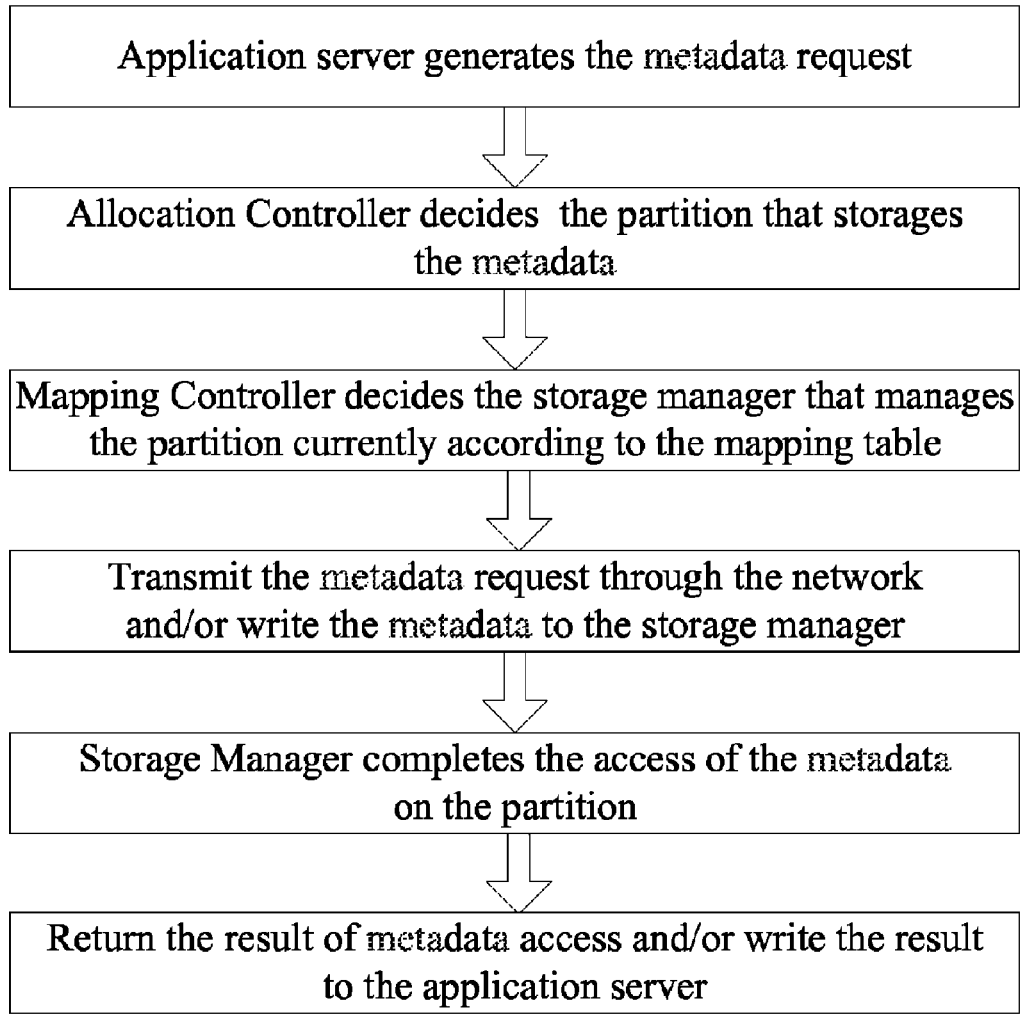
FIG. 3: flow figure of data access achieved by the invention method

FIG. 3 shows the flow figure of data access. The Application program 50 of various file based on the application servers 1 can produce requests to file data. For such file data request, the allocation controller 10 can use the corresponding algorithm to gain the number of partitions to store those data. For example, the file name can gain a label of a partition through hash operation. In this process, different file name is allowed to calculate the same partition's label. A partition always preserves a number of file's information.

After gained the corresponding partition label of the requested file, the mapping controller 20 finds the corresponding storage manager of the label in the mapping table of the storage manager and partitions. Then the data request is transmitted through the network. For the request of written type, written data is sent to the corresponding storage manager. The storage manager will achieve the corresponding access through data access controller. For the request of read type, the result of the access will be transmitted to the application server 1 through the network.

Figure 4:
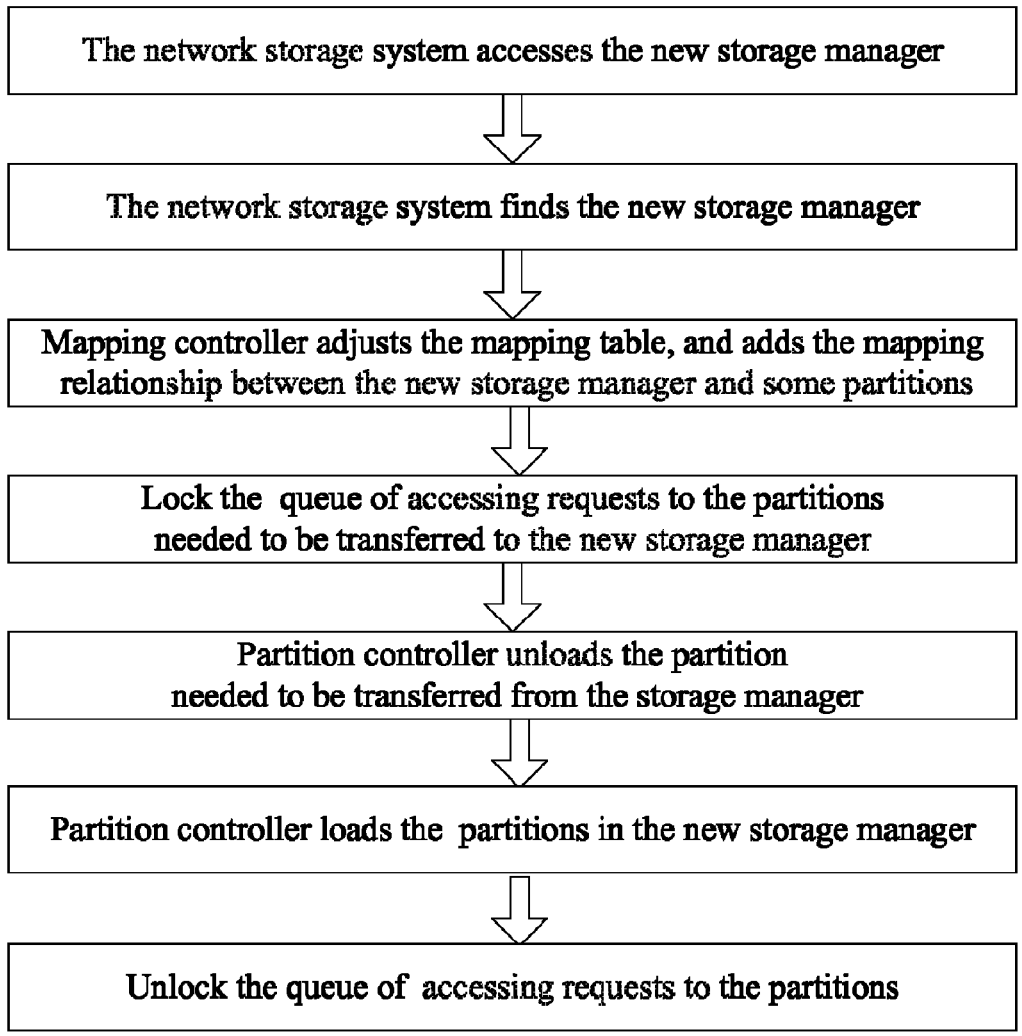
FIG. 4: flow figure of adding more storage servers achieved by the invention method.

FIG. 4 describes the process that the invention makes the storage manager 2 to expend. When the whole system needs to add the corresponding storage managers, the administrator can add dynamically a new physical storage manager. For example, the current storage manager cluster 2 can not complete effectively the overfull request. Adding a new storage manager is simply to connect the storage manager into the system in this environment based on network. The system can find the new storage manager automatically. The Mapping controller 20 adjusts the mapping table according to some arithmetic. It deletes some partitions from the record corresponding to original storage manager cluster in the mapping table. And it adds the mapping relationship related with the new storage manager. Afterward, the partition controller 30 locks the access queue of the partitions needed to be transferred, and stops processing the request in the access queue. In this condition, it unloads the partitions needed to be transferred from the storage manager that manages currently the partition. And it loads these partitions into the storage manager which is added newly. Finally, the access queue of the partition needed to be transferred was unlocked. Subsequently, all data requests of these partitions transferred to the new storage manager are completed through the new added storage manager. The capability of the whole storage manager cluster increases as the load of the other corresponding managers reduces. The scalable process can run dynamically and effectively, and do not involve in any moving of data.

Figure 5:
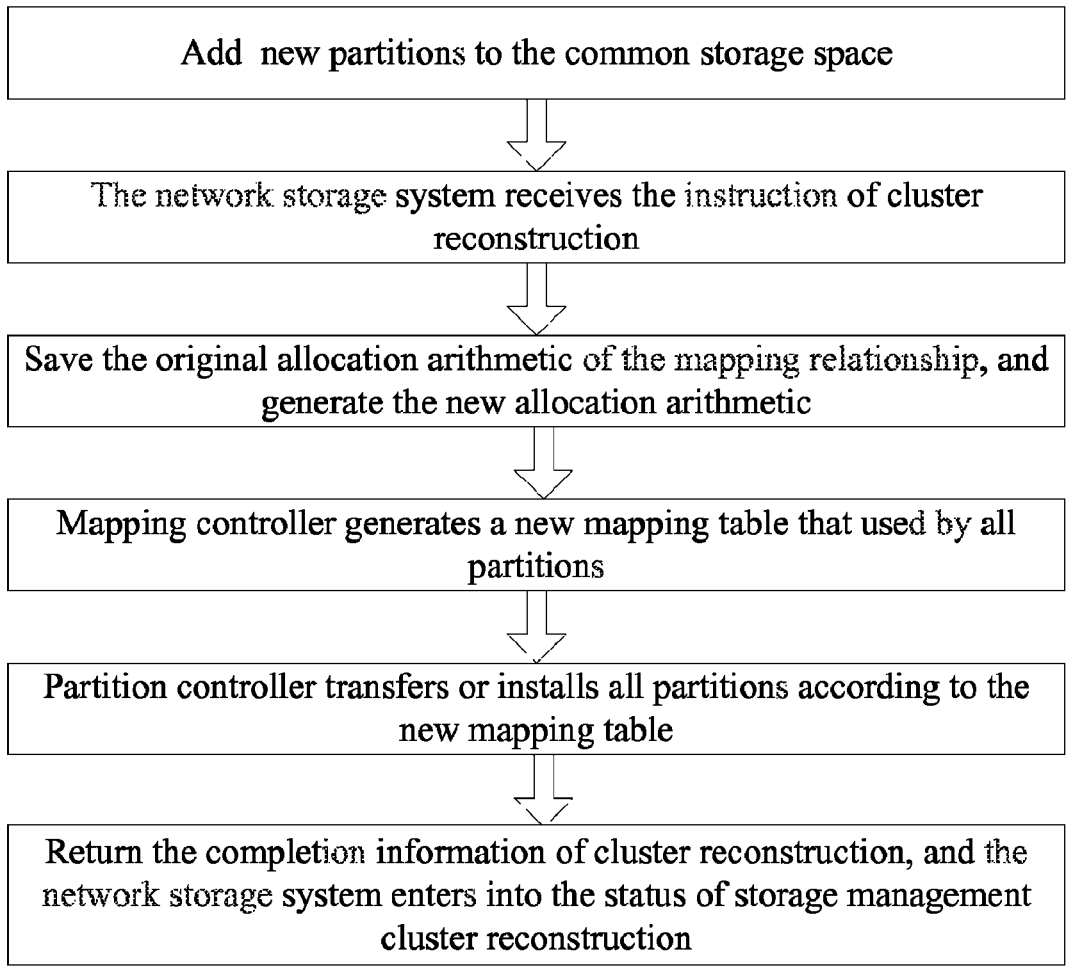
FIG. 5: flow figure of the storage manager cluster rebuilding achieved by the invention method.

FIG. 5 describes the process that the invention makes the storage manager cluster to reconstruct. The expansion of the storage manager cluster 2 is different with general expansion (expansion process as describes with FIG. 4) while that the expansion of the storage manager cluster 2 will breakthrough the number of the current partitions. The number of the partitions is gotten through reconstruction of the storage manager cluster. For example, the number of partitions increases from 128 to 1024, so it would at most support 1024 storage managers in a cluster. Adding storage managers from 128 to 1024 uses expansion process shown in the FIG. 4. Though data need to be moved in the process of the storage manager cluster rebuilding, reconstruction can operate with a quick response time through the method of the invention. First, it needs to add new partitions to the common storage space. For example, it needs to add 1024−128=896 new partitions when the number of partitions increases from 128 to 1024. When administrators issue an order reconstruction, the allocation controller keeps the original arithmetic, and generates a new allocation arithmetic that maps the filename to the expanded number of partition. At the same time, the mapping controller generates a new mapping table used by all partitions. The partition controller transfers or installs all partitions according to the new mapping table. Operation of the process as described above will be completed very soon. System returns the completed information of the cluster reconstruction order. And it enters into the reconstruction status of the storage manager cluster.

When the system is in reconstruction, it need to transfer all data existed before reconstruction to different partitions according to the new allocation arithmetic. When storage manager receives the requests of the data visit of the application server, it makes the normal operation shown in the FIG. 3 in the process of reconstruction if the data requested exists. The data maybe does not be transferred if the data requested does not exist. So the storage manager could work out the number of the partition stored originally in the file according to the old saved distribution arithmetic. The storage manager gets the storage manager that manages currently the partition according to the current mapping table. The data would be transferred from the original partition to the new partition. Finally, the requests of the application server can be responded.

Obviously, it clears that the process of the storage manager cluster reconstruction in this invention doesn't affect the normal operation of the system.

Figure 6:
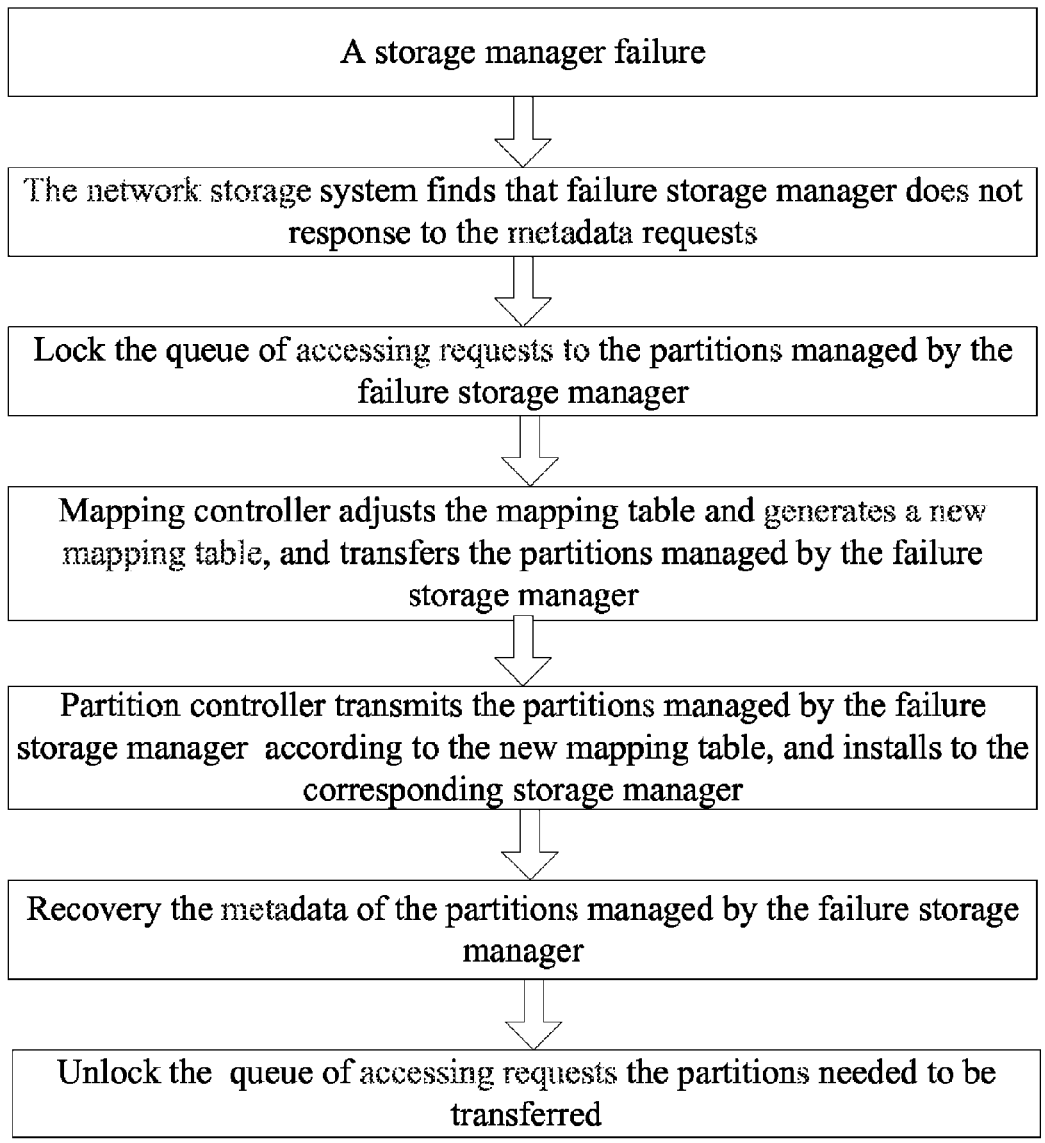
FIG. 6: flow figure of the storage manager failure handling achieved by the invention method.

FIG. 6 describes the process that this invention handles failure storage manager. When there is a failure storage manager, the system can find that the storage manager doesn't respond the data request regardless of the reasons of failure. All the visit queues corresponding to the partition managed by the storage manager will be locked according to the mapping table of the mapping controller. The mapping controller transfers the affected partition into the record of the other storage manager in the cluster, and deletes the records corresponding to the failure storage manager through adjusting the mapping table. And then, the partition controller will transfer the partition managed by the failure storage manager to the storage manager corresponding to the partition in the new mapping table. In addition, it could be recovery the data of every partition by the technology of similar log. Finally, re-activate the visit queues of the affected partition. Obviously, the systems can achieve seamless storage manager failure processing under the condition of not affecting the data visit.

Figure 7:
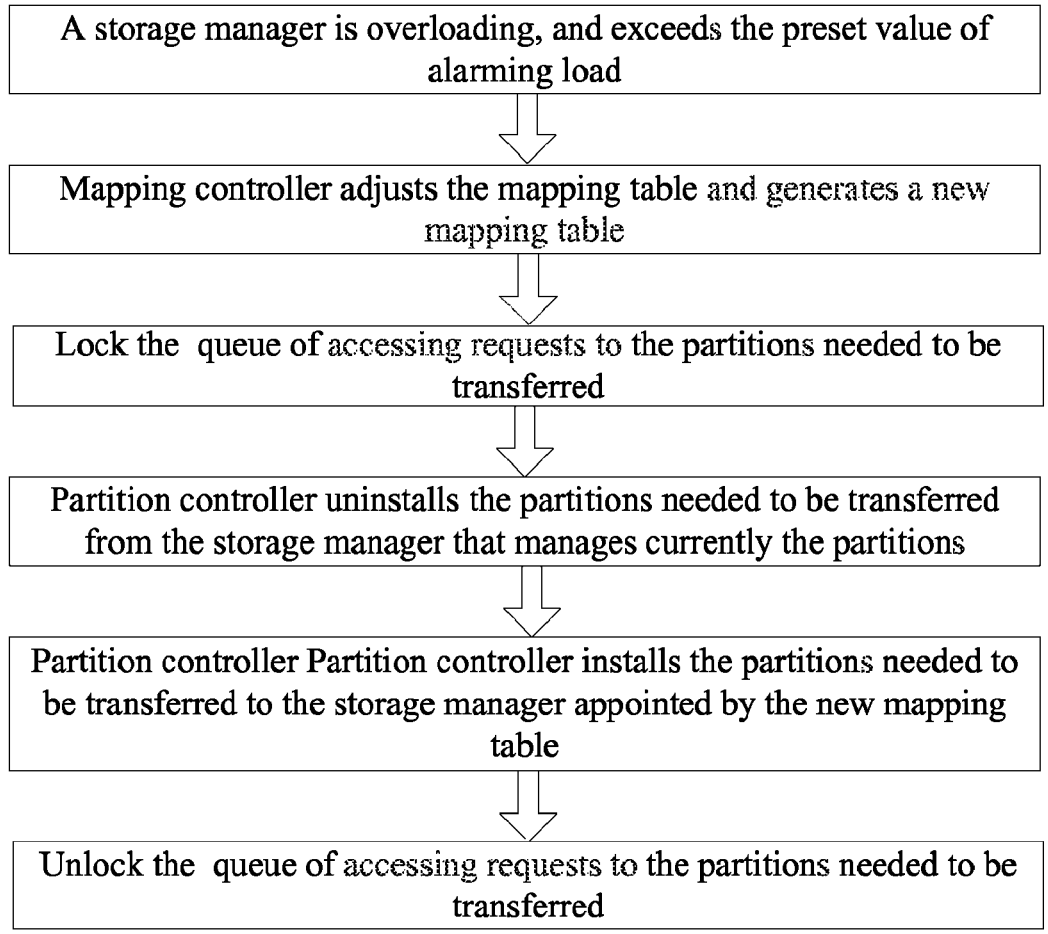
FIG. 7: flow figure of the storage manager cluster dynamic load balancing achieved by the invention method.

FIG. 7 describes the process that the invention makes the storage manager to achieve dynamic load balancing. Dynamic load balancing is used to redistribute the partition managed by the storage manager at the running. It solves problems that some storage managers are overloading but other managers are light loading. The system can monitor itself the load of every storage manager. When the load of a manager exceeds a preset value of alarming loading, the mapping controller adjusts the mapping table, and transfers some overloading partitions managed by the storage manager to some storage managers with light loading. In condition of locking the visit queues of partitions which are needed to be transferred, the partition controller unloads the partitions needed to be transferred from the current storage manager that manages the partitions, and installs the partitions to the storage manager distributed newly. Finally, unlock the visit queue of the partitions needed to be transferred.

This realizes the dynamic load balance adjustment without the moving of any data among the partition.

Figure 8:
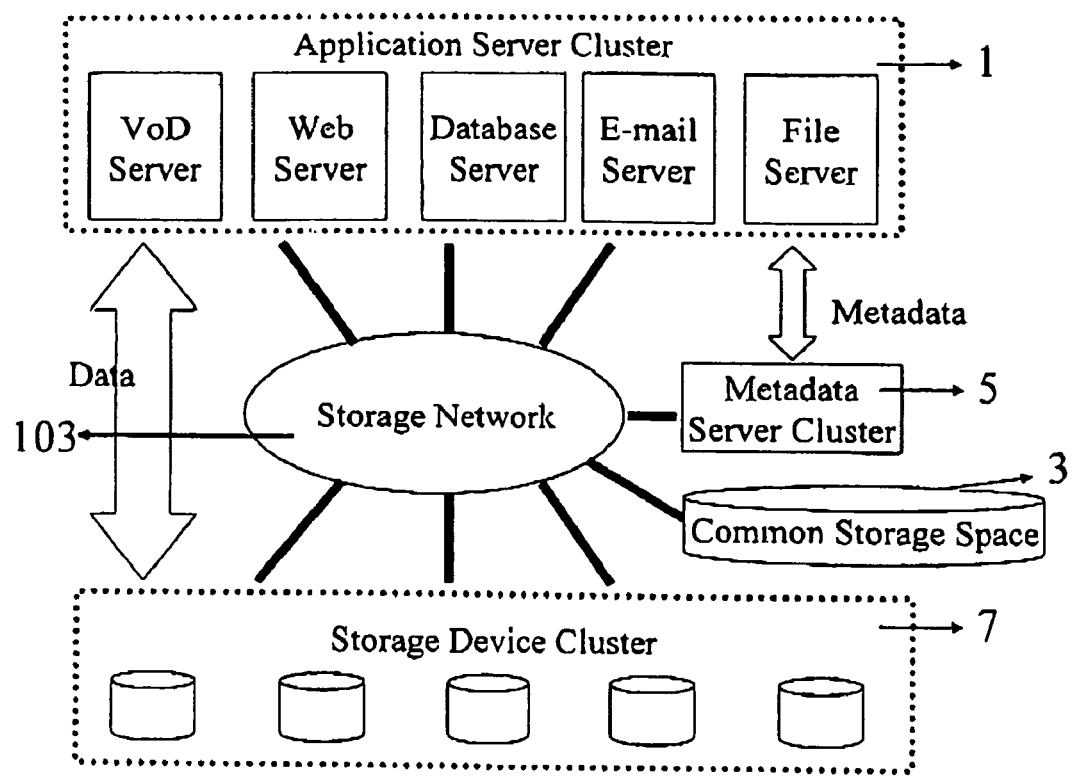
FIG. 8: storage system sketch map to metadata server built by the invention method.
Figure 9:
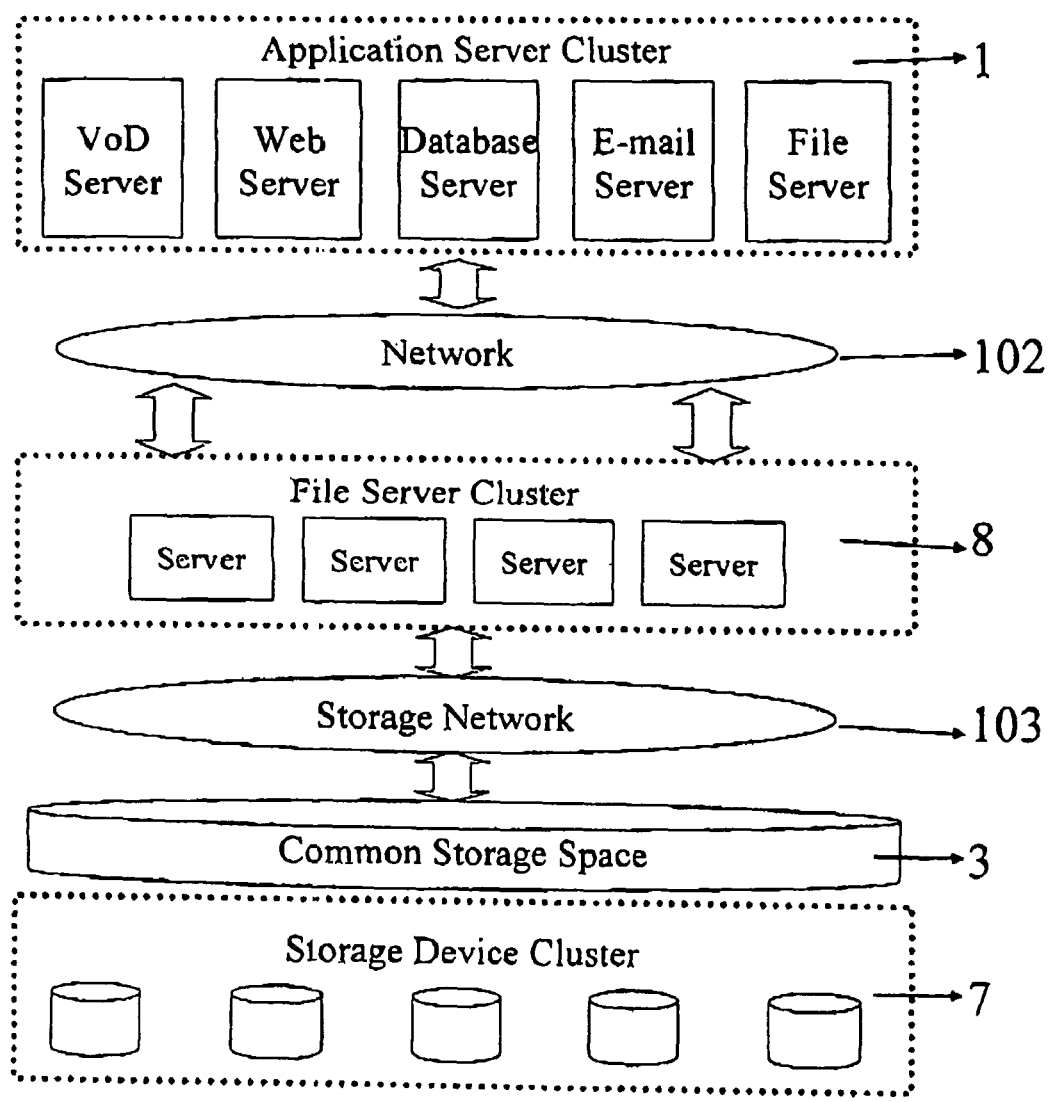
FIG. 9: storage system sketch map to file server built by the invention method.

FIG. 8 and FIG. 9 describes structures of two typical systems according to the invention. Of course, the management methods involved in the invention are not confined to these two applications.

FIG. 8 describes the architecture of the network storage system that the invention uses in the application condition of the metadata server. In the architecture of the application environment, the storage system accessed by each application server 1 is composed by the separated metadata server cluster 5 and storage device cluster 7. Every device in system connects each other through the storage network 103. Metadata server 5 processes the request of metadata by the application server 1. The transmission of the data is completed by the high-speed data channel that connects the storage device cluster 7 and the application server cluster 1. Metadata Server 5 is equivalent to the storage manager of the invention in the application. The Common storage space 3 is used to storage the metadata of the metadata server 5.

Now, more and more storage system uses the structure with the separation of metadata servers and storage equipment, for example, the oriented-object storage system. The data management method of the invention can effectively handle the metadata server expansibility, error dispose and dynamic load balancing issues in this architecture.

FIG. 9 describes the architecture of the network storage system based on the file server cluster in the invention. The Application server 1 can access the storage device 7 in the storage network through the file server cluster 8 in this condition. The request of the scalability of the file server cluster is pressure because the file server cluster 8 is on the I/O route. The file server cluster 8 is equivalent to the storage manager cluster in this system. The storage device cluster 7 can carry out a common storage space 3 through the storage network 103. All data and metadata are stored in the common storage space 3 through the file server cluster 8. The Storage network connects file server cluster 8 and the common storage space 3. The Application server 1 and file server cluster 8 are connected through network 102. And the level of request of the application server 1 is the file.

Although the invention describes the technical solutions in detail, it shouldn't limited to this. Changes or amends made by general technical staff in this field according to the basic guiding ideas of the invention shall belong to the protected scope of the invention.

We claim:

1. A data management method for a network storage system, said network storage system including a storage network, a cluster of storage servers that provides data storage services to application servers connecting to said storage network, and storage space corresponding to each storage server, wherein said data stored in said storage servers includes raw data that are accessed by the application servers and metadata stored in the own local storage space of each of the storage servers, said method comprising:

setting a core manager in each storage server, said core manager:
- separating logically a location of the metadata from each of said storage servers,
- centralizing logically the own local storage spaces of all the storage servers to form logically a common storage space and to make logically the storage servers become storage managers which no longer logically have the own local storage space and for storing its corresponding metadata,
- centralizing logically the metadata of all the storage servers in the common storage space,
- allocating a storage location of the metadata in said common storage space, and
- managing the corresponding relationship between the metadata and said storage managers;
- wherein said common storage space is divided into partitions, said storage managers and said partitions having one to one and/or one to more mapping relationship;

wherein said core manager comprises:
- an allocation controller that distributes the metadata into the partitions of said common storage space,
- a mapping controller that manages the mapping relationship between the partitions of said common storage space and said storage managers by a mapping table, and
- a partition controller that manages the partitions of said common storage space;

said method, further comprising an operation of adding more storage managers including:
(1) a new storage manager connecting to the network storage system;
(2) the network storage system finding the new storage manager;
(3) the mapping controller adjusting the mapping table, and adding the mapping relationship between the new storage manager and some partitions;
(4) the partition controller locking a queue of the accessing requests queue to the partitions needed to be transferred to the new storage manager;
(5) the partition controller unloading the partitions needed to be transferred from the storage manager that currently manages the partitions;
(6) the partition controller loading the partitions in the new storage manager;
(7) unlocking the queue of accessing requests to the partitions.

2. The method as claimed in claim 1, further comprising an operation of metadata accessing including:
(1) an application server sending a metadata accessing request;
(2) said allocation controller allocating a partition for said metadata;
(3) said mapping controller finding the corresponding storage manager of said partition by said mapping table;
(4) transmitting the request and/or writing the metadata to the corresponding storage manager by the storage network;
(5) the corresponding storage manager completing the metadata accessing operation on the partition;
(6) returning the results of the metadata accessing to the application server.

3. The method as claimed in claim 1, further comprising a rebuilding process of the cluster of storage managers including:
(1) adding new partitions to the common storage space;
(2) sending a rebuilding instruction;
(3) the allocation controller keeping an original allocation arithmetic of the mapping relationship, and generating a new allocation arithmetic;
(4) the mapping controller generating a new mapping table that includes all partitions;
(5) the partition controller transferring and/or loading all partitions according to the new mapping table;
(6) returning the rebuilding process for completion and entering a reconstruction status.

4. The method as claimed in claim 1, further comprising a failure handling process of a storage manager including:
(1) the system finding a piece of error information of a storage manager;
(2) the partition controller locking the queue of accessing requests to the partitions managed by the failed storage manager;
(3) the mapping manager adjusting the mapping table and generating a new mapping table;
(4) transferring the partitions managed by the failed storage manager to other storage managers according to the new mapping table;
(5) recovering the metadata of the partitions managed by the failed storage manager;
(6) unlocking the queue of accessing requests to the partitions managed by the failed storage manager.

5. The method as claimed in claim 1, further comprising an operation of load balancing of the storage managers including:
(1) finding an overloading warning of a storage manager;
(2) the mapping controller adjusting the mapping table and generating a new mapping table;
(3) the partition controller locking the queue of requests to the partitions needed to be transferred;
(4) the partition controller unloading the partitions needed to be transferred from the storage manager currently managing the partitions;
(5) the partition controller loading the partitions needed to be transferred on the storage manager appointed by the new mapping table;
6) unlocking the queue of requests to the partitions needed to be transferred.

6. A network storage system comprising:
a storage network,
a cluster of storage managers that provide metadata storage services to application servers connecting to said storage network,
a common storage space storing logically the metadata which are ever stored in the own local storage space of each of storage servers,
a core manager in each storage server, wherein said core manager:
separates logically a location of the metadata from said storage servers, centralizes logically the metadata of all storage servers in the common storage space to make logically the storage servers become said storage managers which no longer logically have the own local storage space for storing its corresponding metadata, wherein the own local storage spaces of all the storage servers form logically said common storage space, allocates a storage location of the metadata in said common storage space, and manages the corresponding relationship between the metadata and said storage managers wherein said common storage space is divided into partitions, said storage managers and said partitions have one to one and/or one to more mapping relationship, wherein said core manager comprises:

an allocation controller that distributes metadata into the partitions of said common storage space, a mapping controller that manages the mapping relationship between the partitions of said common storage space and storage managers by a mapping table, and a partition controller that manages the partitions of said common storage space;

wherein said core manager adds more storage managers including:

(1) a new storage manager connecting to the network storage system;

(2) the network storage system finding the new storage manager;

(3) the mapping controller adjusting the mapping table, and adding the mapping relationship between the new storage manager and some partitions;

(4) the partition controller locking a queue of the accessing requests queue to the partitions needed to be transferred to the new storage manager;

(5) the partition controller unloading the partitions needed to be transferred from the storage manager that currently manages the partitions;

(6) the partition controller loading the partitions in the new storage manager;

(7) unlocking the queue of accessing requests to the partitions.

* * * * *